United States Patent
Lee et al.

(10) Patent No.: US 8,680,877 B2
(45) Date of Patent: Mar. 25, 2014

(54) TOUCH SENSING APPARATUS AND METHOD FOR DETECTING APPROACH

(75) Inventors: Hyung Kew Lee, Gunpo-si (KR); Joon Ah Park, Seoul (KR); Seung Ju Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 299 days.

(21) Appl. No.: 13/181,876

(22) Filed: Jul. 13, 2011

(65) Prior Publication Data

US 2012/0062248 A1 Mar. 15, 2012

(30) Foreign Application Priority Data

Sep. 15, 2010 (KR) .................. 10-2010-0090674

(51) Int. Cl.
*G01R 27/26* (2006.01)
*G06F 3/02* (2006.01)

(52) U.S. Cl.
USPC ........................ 324/679; 324/658; 345/170

(58) Field of Classification Search
USPC ................... 324/658–690; 345/170
See application file for complete search history.

(56) References Cited

U.S. PATENT DOCUMENTS

2009/0088050 A1* 4/2009 Hsu et al. .................. 451/59
2010/0292945 A1* 11/2010 Reynolds et al. ............ 702/65

FOREIGN PATENT DOCUMENTS

| JP | 2010-61384 | 3/2010 |
| JP | 2010-61502 | 3/2010 |
| KR | 10-1009-0098947 | 9/2009 |
| KR | 10-2009-0107640 | 10/2009 |
| KR | 10-2009-0131149 | 12/2009 |

OTHER PUBLICATIONS

Hyeon Kim, Publication No. 1020090107640, see attached machine translation.*

* cited by examiner

*Primary Examiner* — Jermele M Hollington
*Assistant Examiner* — Farhana Hoque
(74) *Attorney, Agent, or Firm* — Staas & Halsey LLP

(57) ABSTRACT

A touch sensing apparatus includes an approach sensing electrode unit including a plurality of first approach sensing electrode arrays disposed on a substrate and a plurality of second approach sensing arrays disposed adjacent to the first approach sensing electrode arrays, a voltage supply unit to supply a voltage to any of the first approach sensing electrode arrays and the second approach sensing electrode arrays, a signal generation unit to generate an approach sensing signal by detecting a variation of capacitance generated between the first approach sensing electrode arrays and the second approach sensing electrode arrays, the variation of capacitance occurring in a 3-dimensional (3D) approach sensing region, and an information generation unit to generate contact information corresponding to the approach sensing signal generated by the signal generation unit.

21 Claims, 7 Drawing Sheets

400

TOUCH SENSING APPARATUS AND METHOD FOR DETECTING APPROACH

CROSS-REFERENCE TO RELATED APPLICATIONS

This application claims the benefit of Korean Patent Application No. 10-2010-0090674, filed on Sep. 15, 2010, in the Korean Intellectual Property Office, the disclosure of which is incorporated herein by reference.

BACKGROUND

1. Field

Example embodiments of the following description relate to a touch sensing apparatus that detects an object approaching within a 3-dimensional (3D) approach sensing region, and a method of detecting a touch of the touch sensing apparatus.

2. Description of the Related Art

A touch sensing apparatus inputs a signal according to contact by an object such as a human finger and a touch pen. A touch pad and a touch screen are embodied using the touch sensing apparatus. For example, the touch sensing apparatus may supply a touch screen function by being mounted to a displaying surface of an image display panel.

A user of the touch sensing apparatus may input desired information in a touching manner while reviewing characters or images being displayed on the image display panel. Recently, the touch sensing apparatus is generally used for a mobile terminal for convenient user input.

A conventional touch sensing apparatus detects a 2-dimensional (2D) position of a finger or a touch pen contacting a surface of the apparatus. In other words, the user input is achieved by contact with the finger or the touch pen. Therefore, configurations of interfaces are limited.

SUMMARY

According to example embodiments, there may be provided a touch sensing apparatus that enables generation of contact information regarding an object by detecting approach of the object occurring within a 3-dimensional (3D) approach sensing region defined at an upper portion of a plurality of first approach sensing electrode arrays and a plurality of second approach sensing electrode arrays which are 2-dimensionally arranged on a substrate, and a method of detecting approach by the touch sensing apparatus.

According to example embodiments, there may be also provided a touch sensing apparatus that enables accurately detecting approach of an object within the 3D approach sensing region, by arranging the plurality of first approach sensing electrode arrays and the plurality of second approach sensing electrode arrays close to each other.

The foregoing and/or other aspects are achieved by providing a touch sensing apparatus including an approach sensing electrode unit including a plurality of first approach sensing electrode arrays disposed on a substrate and a plurality of second approach sensing arrays disposed adjacent to the plurality of first approach sensing electrode arrays, a voltage supply unit to supply a voltage to at least one of the plurality of first approach sensing electrode arrays and the plurality of second approach sensing electrode arrays, a signal generation unit to generate an approach sensing signal by detecting a variation of capacitance generated between the plurality of first approach sensing electrode arrays and the plurality of second approach sensing electrode arrays, the variation of capacitance occurring in a 3-dimensional (3D) approach sensing region, and an information generation unit to generate contact information corresponding to the approach sensing signal generated by the signal generation unit.

The signal generation unit may generate the approach sensing signal by detecting a change of an electric field formed between the plurality of first approach sensing electrode arrays and the plurality of second approach sensing electrode arrays.

The touch sensing apparatus may further include a switch unit connected to the voltage supply unit to switch on at least one of the plurality of first approach sensing electrode arrays and the plurality of second approach sensing electrode arrays and to supply a voltage to the switched electrode arrays.

The contact information may include at least one of position information and motion information regarding an object approaching within the 3D approach sensing region.

The plurality of second approach sensing electrode arrays may intersect the plurality of first approach sensing electrode arrays, and include a through hole disposed at each intersection position with the plurality of first approach sensing electrode arrays.

The plurality of first approach sensing electrode arrays may include a plurality of first electrode pads arranged at predetermined intervals along one axis of the substrate, and a plurality of first connection leads arranged to connect the plurality of first electrode pads to one another.

The plurality of second approach sensing electrode arrays may include a plurality of second electrode pads arranged at predetermined intervals along the other axis of the substrate, and a plurality of second connection leads arranged to connect the plurality of second electrode pads while intersecting the plurality of first connection leads.

The plurality of first electrode pads and the plurality of second electrode pads may have a polygonal shape and vertically cross each other.

The plurality of first connection leads may be are shorter than a minimum width of the plurality of first electrode pads, and the plurality of second connection leads may be shorter than a minimum width of the plurality of second electrode pads.

The plurality of first approach sensing electrode arrays may further include a plurality of first sub electrode pads connected to both ends of each of the plurality of first electrode pads in parallel by a plurality of first sub connection leads.

The plurality of second approach sensing electrode arrays may further include a plurality of second sub electrode pads vertically connected to both ends of each of the plurality of second electrode pads and inserted in spaces formed between the plurality of first electrode pads and the plurality of first sub electrode pads.

The foregoing and/or other aspects are achieved by providing a method of sensing an approach by a touch sensing apparatus, including supplying a voltage to at least one of a plurality of first approach sensing electrode arrays disposed on a substrate and a plurality of second approach sensing arrays disposed adjacent to the plurality of first approach sensing electrode arrays, detecting a variation of capacitance generated between the plurality of first approach sensing electrode arrays and the plurality of second approach sensing electrode arrays, the variation of capacitance occurring in a 3-dimensional (3D) approach sensing region, generating an approach sensing signal denoting detection of approach within the 3D approach sensing region using the detected capacitance, and generating contact information corresponding to the generated approach sensing signal.

The detecting of the variation of capacitance may include detecting the capacitance variation according to a change of an electric field generated between the plurality of first approach sensing electrode arrays and the plurality of second approach sensing electrode arrays.

The supplying of the voltage may include switching on at least one of the plurality of first approach sensing electrode arrays and the plurality of second approach sensing electrode arrays, and supplying the voltage to the switched electrode arrays.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to exemplary embodiments of the present invention, examples of which are illustrated in the accompanying drawings. In the description of the present invention, if detailed descriptions of related disclosed art or configuration are determined to unnecessarily make the subject matter of the present invention obscure, they will be omitted. Terms to be used below are defined based on their functions in the present invention and may vary according to users, user's intentions, or practices. Therefore, the definitions of the terms should be determined based on the entire specification.

Figure 1:
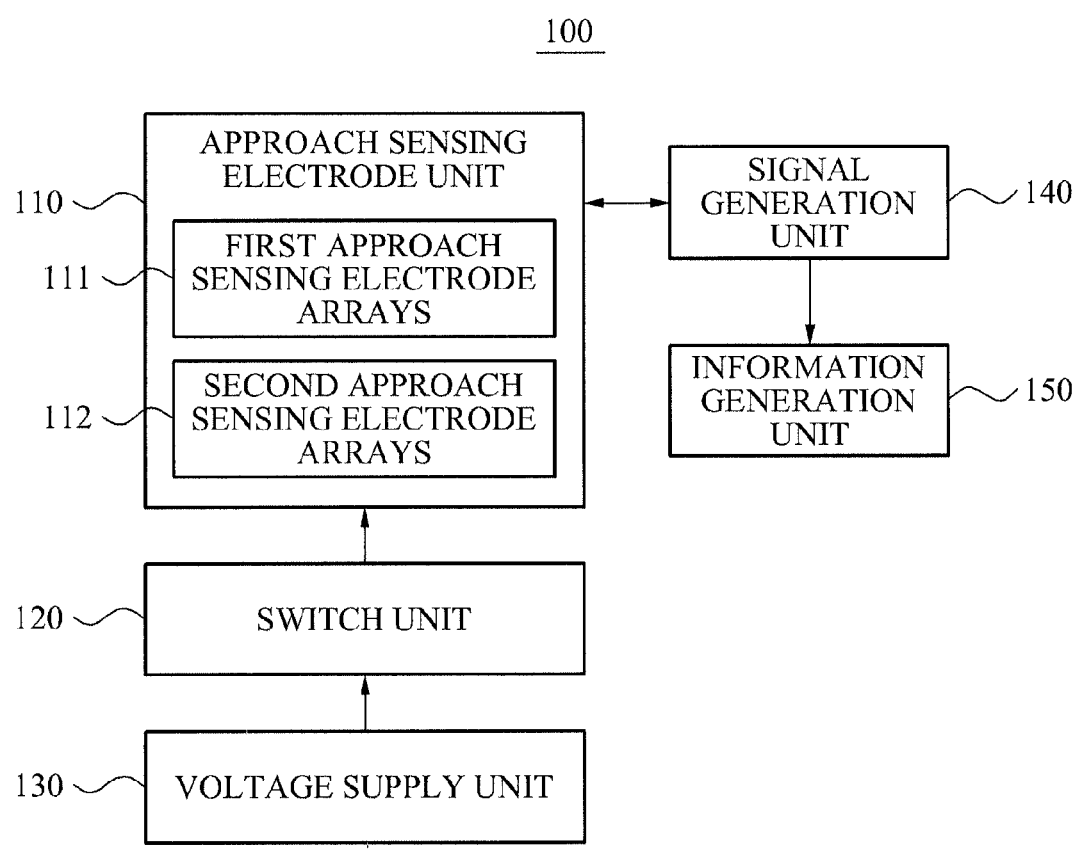
FIG. 1 illustrates a block diagram showing a configuration of a touch sensing apparatus according to example embodiments.

FIG. 1 illustrates a block diagram showing a touch sensing apparatus 100 according to example embodiments. The touch sensing apparatus 100 shown in FIG. 1 detects approach of an object such as a finger or a touch pen within a 3-dimensional (3D) approach sensing region detectable by the touch sensing apparatus 100, and generates contact information regarding the object.

Referring to FIG. 1, the touch sensing apparatus 100 includes an approach sensing electrode unit 110, a switch unit 120, a voltage supply unit 130, a signal generation unit 140, and an information generation unit 150.

The approach sensing electrode unit 110 includes a plurality of first approach sensing electrode arrays 111 and a plurality of second approach sensing electrode arrays 112 which are 2-dimensionally arranged on a substrate such as a printed circuit board (PCB).

The plurality of first approach sensing electrode arrays 111 are arranged along one axis of the substrate. The plurality of second approach sensing electrode arrays 112 are arranged along the one axis or the other axis of the substrate, adjacent to the plurality of first approach sensing electrode arrays 111.

The plurality of second approach sensing electrode arrays 112 may be parallel with the first approach sensing electrode arrays 111 when arranged along the one axis of the substrate. Alternatively, the plurality of second approach sensing electrode arrays 112 may intersect the first approach sensing electrode arrays 111 when arranged along the other axis.

In the case where the plurality of first approach sensing electrode arrays 111 and the plurality of second approach sensing electrode arrays 112 intersect, the plurality of first approach sensing electrode arrays 111 and the plurality of second approach sensing electrode arrays 112 may be adjacent to but separated from each other at intersection positions.

The switch unit 120 switches on at least one of the plurality of first approach sensing electrode arrays 111 and the plurality of second approach sensing electrode arrays 112.

The voltage supply unit 130 supplies a voltage to at least one of the plurality of first approach sensing electrode arrays 111 and the plurality of second approach sensing electrode arrays 112. Specifically, the voltage supply unit 130 is electrically connected with the switch unit 120 and supplies a voltage to at least one of the plurality of first approach sensing electrode arrays 111 and the plurality of second approach sensing electrode arrays 112, which are switched by the switch unit 120.

For example, when the plurality of first approach sensing electrode arrays 111 are switched on by the switch unit 120, the voltage supply unit 130 may supply a voltage to the plurality of first approach sensing electrode arrays 111 through the switch unit 120.

The voltage supply unit 130 may be directly connected to and supply the voltage to at least one of the plurality of first approach sensing electrode arrays 111 and the plurality of second approach sensing electrode arrays 112, rather than supplying the voltage through the switch unit 120.

The signal generation unit 140 detects a variation of capacitance occurring between the plurality of first approach sensing electrode arrays 111 and the plurality of second approach sensing electrode arrays 112, and thereby generates an approach sensing signal.

More specifically, the signal generation unit 140 detects the capacitance variation corresponding to a change of an electric field formed between the plurality of first approach sensing electrode arrays 111 and the plurality of second approach sensing electrode arrays 112, and accordingly generates the approach sensing signal. For example, in a state where the voltage is supplied to the plurality of first approach sensing electrode arrays 111, when an object approaches within a 3D approach sensing region, the electric field is changed at a position between one of the plurality of first approach sensing electrode arrays 111 and one of the plurality of second approach sensing electrode arrays 112, the ones disposed closest to the object. The electric field change causes the variation of the capacitance between the first approach sensing electrode array and the second approach sensing electrode array which are closest to the object.

The signal generation unit 140 detects the capacitance between the plurality of first approach sensing electrode arrays 111 and the plurality of second approach sensing electrode arrays 112 by sequentially scanning the plurality of first approach sensing electrode arrays 111 or the plurality of second approach sensing electrode arrays 112, which are not supplied with the voltage, for example, not switched on by the switch unit 120. Here, the signal generation unit 140 may sequentially scan the plurality of first approach sensing electrode arrays 111 and the plurality of second approach sensing electrode arrays 112 not supplied with the voltage by the voltage supply unit 130 at a speed of about 10 times/sec or higher.

During detection of the capacitance, when the capacitance detected from a certain position is different from a reference capacitance, the signal generation unit 140 may calculate a difference between the detected capacitance and the reference capacitance and generate an approach sensing signal denoting detection of approach within the 3D approach sensing region.

The signal generation unit 140 may generate the approach sensing signal which includes information on x and y coordinates of the first approach sensing electrode array 111 and the second approach sensing electrode array 112, where the capacitance different from the reference capacitance is detected, and information on a z coordinate corresponding to the calculated difference of capacitance.

Here, the reference capacitance refers to a capacitance of when there is no object within the 3D approach sensing region detectable by the approach sensing electrode unit 110. The reference capacitance may be pre-stored or preset at the time of manufacturing the touch sensing apparatus 100.

The information generation unit 150 generates contact information corresponding to the approach sensing signal generated by the signal generation unit 140. The information generation unit 150 may generate the contact information of the object using the x, y, and z coordinates included in the approach sensing signal.

The touch sensing apparatus 100 shown in FIG. 1 may generate the contact information by detecting an object approaching within the 3D approach sensing region detectable by the touch sensing apparatus 100. Therefore, the contact information may be generated even when the object approaches without a direct contact with the touch sensing apparatus 100. Thus, the contact information may be generated efficiently.

Figure 2:
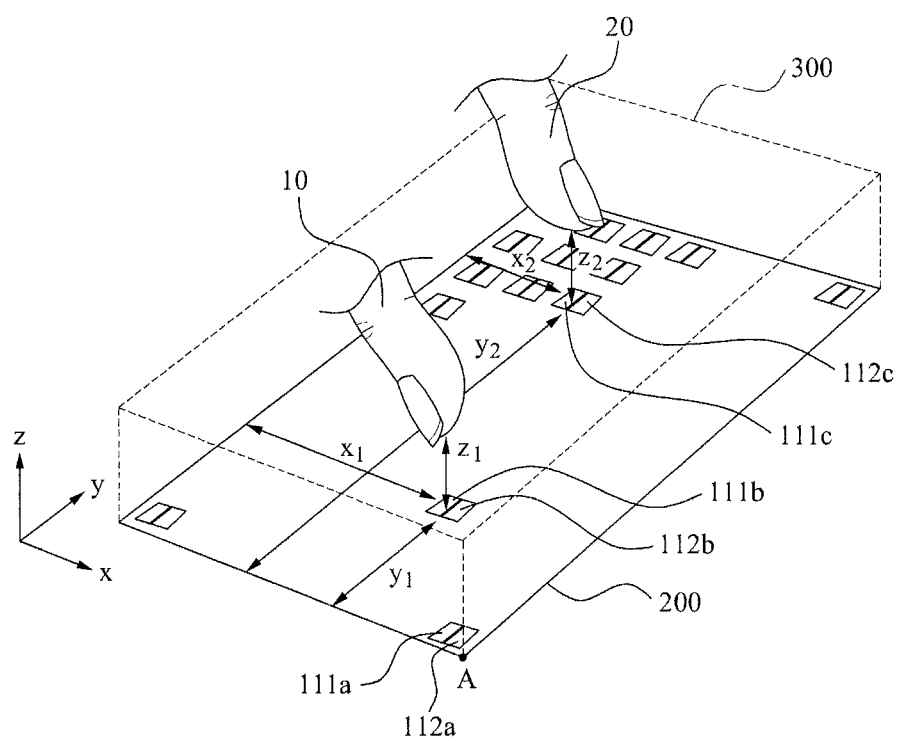
FIG. 2 illustrates a block diagram showing a structure of a touch sensing apparatus according to example embodiments.
Figure 3:
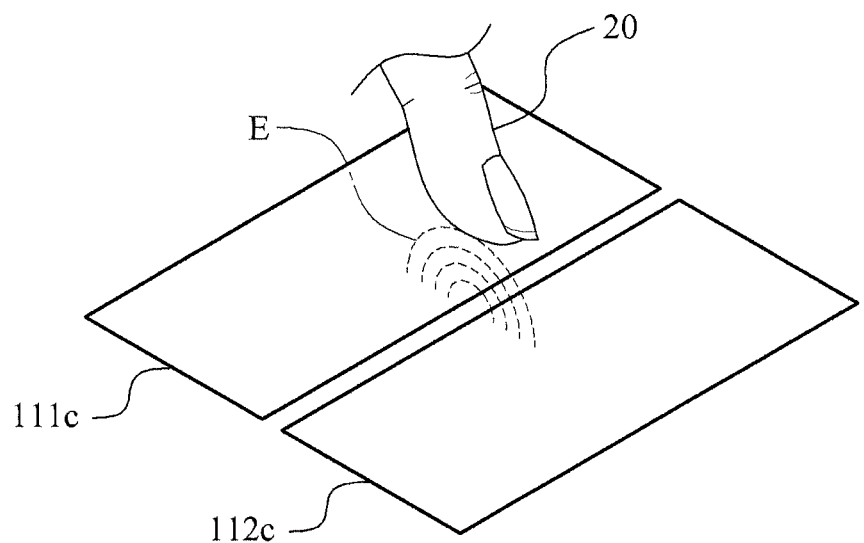
FIG. 3 illustrates a diagram showing an approach sensing operation of an approach sensing electrode unit according to example embodiments.

FIG. 2 illustrates a block diagram showing a structure of a touch sensing apparatus 100 according to example embodiments. FIG. 3 illustrates a diagram showing an approach sensing operation of an approach sensing electrode unit 100 according to example embodiments The touch sensing apparatus 100 shown in FIG. 2 may include a plurality of first approach sensing electrode arrays, for example, a first approach sensing electrode array 111a, a first approach sensing electrode array 111b, and a first approach sensing electrode array 111b, arranged on a substrate 200, and a plurality of second approach sensing electrode arrays, for example, a second approach sensing electrode array 112a, a second approach sensing electrode array 112b, and a second approach sensing electrode array 112b, arranged adjacent to the plurality of first approach sensing electrode arrays.

In an embodiment, a greater number of the first approach sensing electrode arrays and the second approach sensing electrode arrays may be arranged in pairs on the substrate 200. However, for convenience of description, the embodiments will be explained with respectively three first approach sensing electrode arrays and second approach sensing electrode arrays.

For example, when a thumb 10 and an index finger 20 approach and enter a 3D approach sensing region 300, a variation of capacitance occurs between a pair of the first approach sensing electrode array and the second approach sensing electrode array, the pair closest to the thumb 10 and the index finger 20. The touch sensing apparatus 100 detects the capacitance variation and calculates 3D coordinates of the arrays closest to the thumb 10 and the index finger 20.

In other words, the touch sensing apparatus 100 may calculate a 3D coordinate $(x_1, y_1, z_1)$ of the first approach sensing electrode array 111b and the second approach sensing electrode array 112b which are closest to the thumb 10, and a 3D coordinate $(x_2, y_2, z_2)$ of the first approach sensing electrode array 111c and the second approach sensing electrode array 112c which are closest to the index finger 20. The 3D coordinates $x_1, y_1, z_1, x_2, y_2$, and $z_2$ may be calculated according to distances to a reference position A.

The capacitance variation between two arrays may be caused by a change of the electric field.

As shown in FIG. 3, when the index finger 20 gets in the 3D approach sensing region 300 and approaches a certain position, flow of an electric field E is generated between the first approach sensing electrode array 111c and the second approach sensing electrode array 112c which are closest to the index finger 20. Therefore, the electric field E flowing between the first approach sensing electrode array 111c and the second approach sensing electrode array 112c is changed. In addition, the capacitance between the first approach sensing electrode array 111c and the second approach sensing electrode array 112c may be varied according to the change of the electric field.

The touch sensing apparatus 100 may generate the approach sensing signal by detecting the capacitance variation between the first approach sensing electrode array 111c and the second approach sensing electrode array 112c. The approach sensing signal may include a 3D coordinate of a position of the index finger 20 within the 3D approach sensing region. The touch sensing apparatus 100 may generate position information of the object using the 3D coordinate.

When the approach sensing signal is continuously generated for successive time periods, the touch sensing apparatus 100 may generate motion information of the object using the approach sensing signals.

The 3D approach sensing region 300 detectable by the touch sensing apparatus 100 may be a region where the electric field flowing between the plurality of first approach sensing electrode arrays 111 and the plurality of second approach sensing electrode arrays 112 on the substrate 200 is changed. The 3D approach sensing region 300 may be varied depending on the number of the first and second approach sensing electrode arrays and sensitivity.

To generate the contact information using approach of the object as opposed to contact of the object, the approach of the object within the 3D approach sensing region 300 needs to be accurately detected. For this purpose, dispersion of the electric field E may be only between the pair of the first approach sensing electrode array 111 and the second approach sensing electrode array 112 that are closest to the object. Therefore, the plurality of first approach sensing electrode arrays 111 and the plurality of second approach sensing electrode arrays 112 may be arranged in consideration of dispersion of the electric field according to the approach of the object.

Different from the array arrangement described with reference to FIG. 2 the first approach sensing electrode arrays and the second approach sensing electrode arrays may intersect each other. In this case, an area in which the first approach sensing electrode arrays 111 and the second approach sensing electrode arrays 112 are disposed close to each other may be increased while a total intersection area is minimized.

The electric field E is formed between a pair of neighboring approach sensing electrode arrays 111,112. The electric field E is concentrated on the intersection area between the pair of neighboring approach sensing electrode arrays 111, 112 and therefore is not easily dispersed by an approaching object. Considering such characteristics of the electric field, the first approach sensing electrode arrays 111 and the second approach sensing electrode arrays 112 may be arranged as shown in FIGS. 4 through 8.

Figure 4:
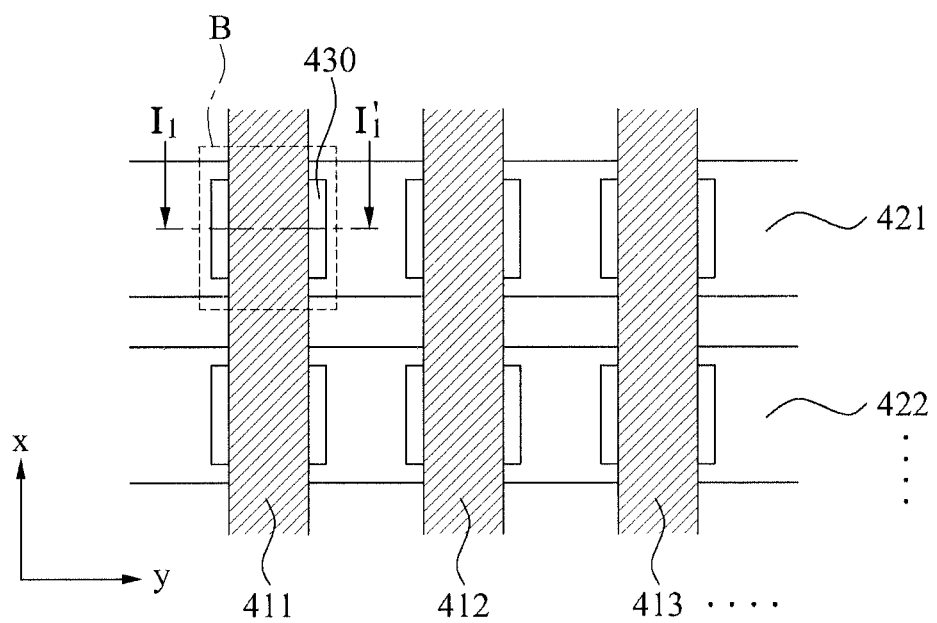
FIG. 4 illustrates a diagram showing a structure of an approach sensing electrode unit according to example embodiments.
Figure 5:
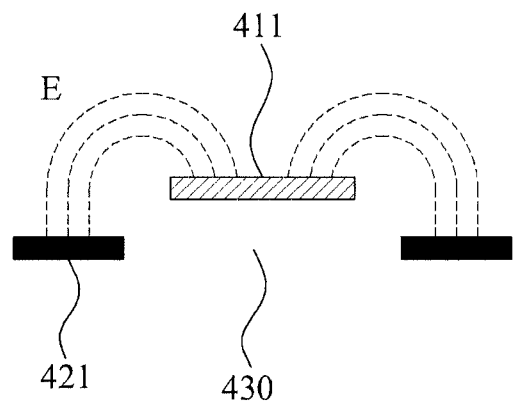
FIG. 5 illustrates a diagram showing an approach sensing operation of the approach sensing electrode unit shown in FIG. 4.

FIG. 4 illustrates a diagram showing a structure of an approach sensing electrode unit 400 according to example embodiments. FIG. 5 illustrates a diagram showing an approach sensing operation of the approach sensing electrode unit 400 shown in FIG. 4.

The approach sensing electrode unit 400 includes a plurality of first approach sensing electrode arrays, for example, a first approach sensing electrode array 411, a first approach sensing electrode array 412, and a first approach sensing electrode array 413, and a plurality of second approach sensing electrode arrays, for example, a second approach sensing electrode array 421 and a second approach sensing electrode array 422. Although FIG. 2 shows one electrode disposed in one spot position as the approach sensing electrode array, FIGS. 4 and 5 show one electrode linearly arranged along one axis or the other axis as the approach sensing electrode array.

The first approach sensing electrode arrays 411, 412, and 413 are separately arranged in parallel along one axis of a substrate (not shown). The second approach sensing electrode arrays 421 and 422 are separately arranged in parallel along the other axis of the substrate, while intersecting the first approach sensing electrode arrays 411, 412, and 413.

The second approach sensing electrode arrays 421 and 422 include through holes 430 formed at each intersection position with respect to the first approach sensing electrode arrays 411, 412, and 413. The intersection area between the first approach sensing electrode arrays 411, 412, and 413 and the second approach sensing electrode arrays 421 and 422 may be minimized by the existence of the through holes 430.

FIG. 5 is a sectional view of a region B in FIG. 4, cut along a line $I_1$-$I_1'$. The first approach sensing electrode array 411 and the second approach sensing electrode array 421 intersect in the region B, being vertically separated by a predetermined interval.

Since the second approach sensing electrode array 421 includes the through holes 430 at the intersection positions with respect to the first approach sensing electrode array 411, the total intersection area is minimized.

An electric field E flows between the first approach sensing electrode array 411 and the second approach sensing electrode array 421. When a finger (not shown) gets in a 3D approach sensing region and approaches an upper portion of the two arrays 411 and 421, the flow of the electric field E may be changed by the finger as shown in FIG. 5. According to the change of the electric field E, the capacitance between the first approach sensing electrode array 411 and the second approach sensing electrode array 421 may be varied. That is, the capacitance may significantly increase.

The touch sensing apparatus may generate an approach sensing signal using the 3D coordinate of the position where the capacitance variation is detected, and generate contact information using the approach sensing signal.

Figure 6:
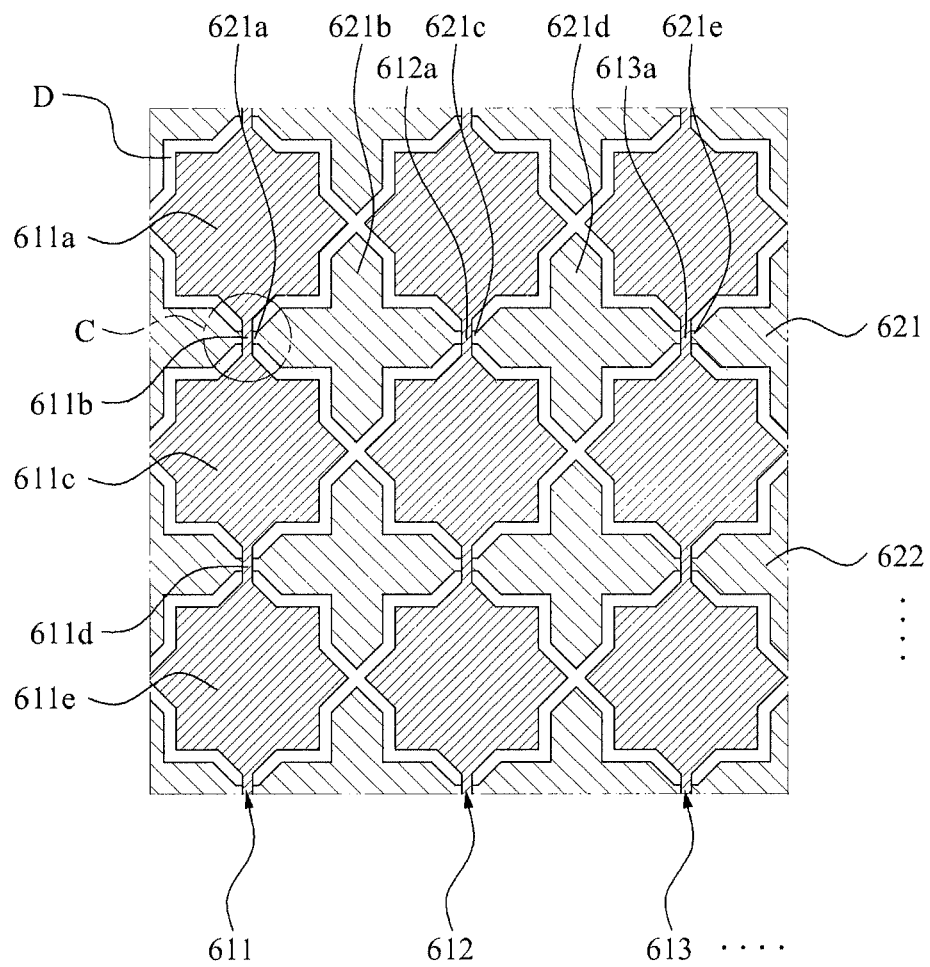
FIG. 6 illustrates a diagram showing a structure of an approach sensing electrode unit according to other example embodiments.
Figure 7:
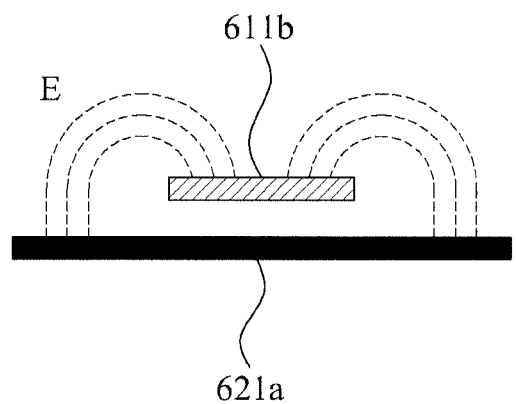
FIG. 7 illustrates a diagram showing an approach sensing operation of the approach sensing electrode unit shown in FIG. 6.

FIG. 6 illustrates a diagram showing a structure of an approach sensing electrode unit according to other example embodiments. FIG. 7 illustrates a diagram showing an approach sensing operation of the approach sensing electrode unit shown in FIG. 6.

The approach sensing electrode unit may include a plurality of first approach sensing electrode arrays, for example, a first approach sensing electrode array 611, a first approach sensing electrode array 612, and a first approach sensing electrode array 613, and a plurality of second approach sensing electrode arrays, for example, a second approach sensing electrode array 621 and a second approach sensing electrode array 622.

The first approach sensing electrode arrays 611, 612 and 613 may each include a plurality of first electrode pads arranged at predetermined intervals along one axis of a substrate (not shown), and a plurality of first connection leads interconnecting the plurality of first electrode pads.

For example, the first approach sensing electrode array 611 may include the plurality of first electrode pads 611a, 611c, and 611e, and a plurality of first connection leads 611b and 611d. The other first approach sensing electrode arrays 612 and 613 may have the same structure as the first approach sensing electrode array 611.

The second approach sensing electrode arrays 621 and 622 may each include a plurality of second electrode pads arranged at predetermined intervals along the other axis of the substrate, and a plurality of second connection leads. The second electrode pads may be separated from the first electrode pads by a predetermined distance D. The second connection leads may interconnect the second electrode pads while intersecting the first connection leads.

For example, the second approach sensing electrode array 621 may include the plurality of second electrode pads 621b and 621d, and a plurality of second connection leads 621a, 621c, and 621e. The second connection leads 621a, 621c, and 621e may intersect first connection leads 611b, 612a, and 613a shown in FIG. 6, respectively.

The pluralities of first electrode pads and second electrode pads have a polygonal shape and vertically cross each other.

Referring to FIG. 6, the first electrode pads 611a, 611c, and 611e each have an octagonal shape and the second electrode pads 621b and 621d each have a cross shape corresponding to a space formed among four first electrode pads, that is, upper, lower, right, and left first electrode pads. Accordingly, an area in which the first electrode pads and the second electrode pads are close to each other increases. Therefore, when an object approaches, the electric field is dispersed by the object.

The plurality of first connection leads 611b and 611d have a width smaller than a minimum width of the plurality of first electrode pads 611a, 611c, and 611e. The plurality of second connection leads 621a, 621c, and 621e have a width smaller than a minimum width of the plurality of second electrode pads 621b and 621d. Thus, since widths of the first connection leads 611b and 611d and the second connection leads 621a, 621c, and 621e are short, the total intersection area may be minimized. Accordingly, since the area where the electric field is concentrated is reduced, approach of the object may be sensitively detected even at the intersection positions.

FIG. 7 is a sectional view of a region C of FIG. 6. The first connection lead 611b and the second connection leads 621a intersect in the region C, being vertically separated by a predetermined interval.

When a finger (not shown) gets in a 3D approach sensing region and approaches an upper portion of the first connection lead 611b and the second connection lead 621a, the flow of the electric field E may be changed by the finger. According to the change of the electric field E, the capacitance between the first connection lead 611b and the second connection lead 621a may be varied.

The touch sensing apparatus may generate an approach sensing signal using a 3D coordinate of the position where the capacitance variation is detected, and generate contact information using the approach sensing signal.

Figure 8:
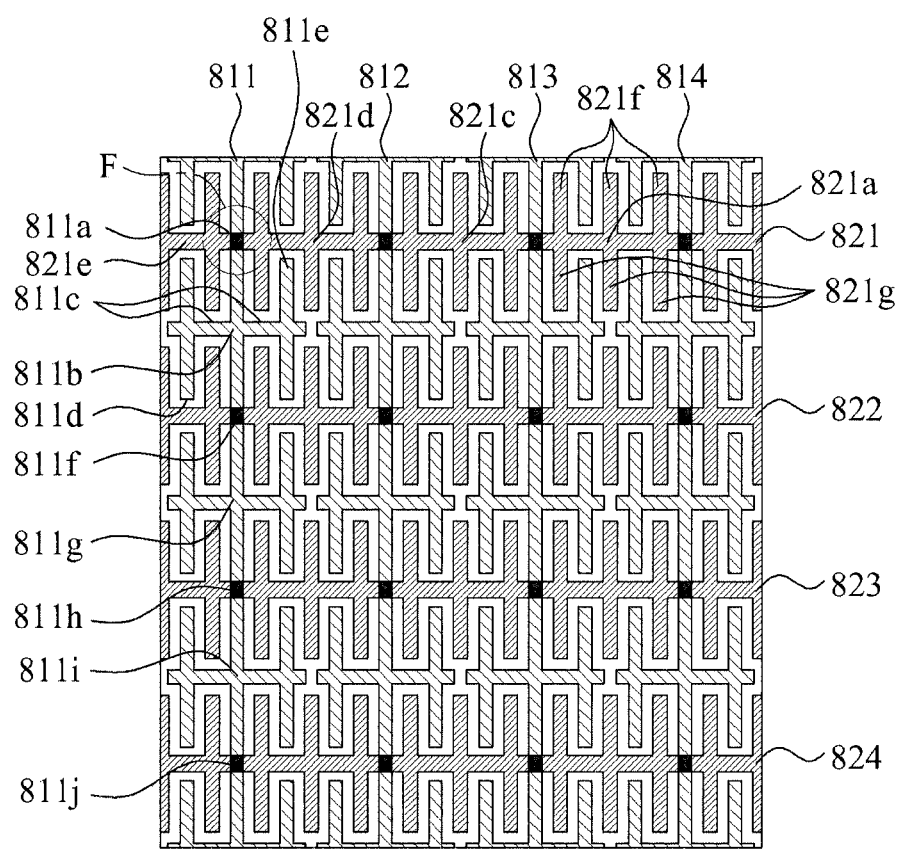
FIG. 8 illustrates a diagram showing a structure of an approach sensing electrode unit according to still other example embodiments.
Figure 9:
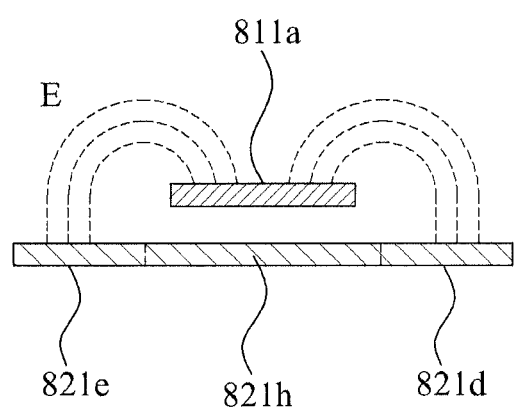
FIG. 9 illustrates a diagram showing an approach sensing operation of the approach sensing electrode unit shown in FIG. 8.

FIG. 8 illustrates a diagram showing a structure of an approach sensing electrode unit 110 according to still other example embodiments. FIG. 9 illustrates a diagram showing an approach sensing operation of the approach sensing electrode unit shown in FIG. 8.

The approach sensing electrode unit 110 includes a plurality of first approach sensing electrode arrays 811, 812, 813, and 814, and a plurality of second approach sensing electrode arrays 821, 822, 823, and 824.

The plurality of first approach sensing electrode arrays 811, 812, 813, and 814 each include a plurality of first electrode pads arranged at predetermined intervals along one axis of a substrate (not shown), and a plurality of first connection leads interconnecting the first electrode pads.

In addition, the first approach sensing electrode arrays 811, 812, 813, and 814 may further include a plurality of first sub connection leads vertically connected to both ends of each of the plurality of first approach sensing electrode arrays, and a plurality of first sub electrode pads parallel-connected to both ends of each of the plurality of first electrode pads through the plurality of first sub connection leads.

For example, the first approach sensing electrode array 811 may include a plurality of first electrode pads 811b, 811g, and 811i, and a plurality of first connection leads 811a, 811f, 811h, and 811j. The plurality of first electrode pads 811b, 811g, and 811i includes a plurality of first sub connection leads 811c and a plurality of first sub electrode pads 811d and 811e. The other first approach sensing electrode arrays 812, 813, and 814 may have the same structure as the first approach sensing electrode array 811.

The plurality of second approach sensing electrode arrays 821, 822, 823, and 824 may include a plurality of second electrode pads arranged at predetermined intervals along the other axis of the substrate, and a plurality of second connection leads interconnecting the second electrode pads.

The plurality of second approach sensing electrode arrays 821, 822, 823, and 824 may further include a plurality of second sub electrode pads which are vertically connected to both ends of each of the plurality of second electrode pads and inserted in spaces formed between the plurality of second electrode pads and the plurality of first sub electrode pads.

For example, the second approach sensing electrode array 821 may include a plurality of second electrode pads 821a, 821c, 821d, and 821e, and a plurality of second sub electrode pads 821f and 821g vertically connected with the second electrode pads 821a, 821c, 821d, and 821e. Although not shown, additionally, the second approach sensing electrode array 821 may include a plurality of second connection leads at intersection positions with the plurality of first approach sensing electrode arrays 811, 812, 813, and 814.

The first approach sensing electrode arrays 811, 812, 813, and 814 and the second approach sensing electrode arrays 821, 822, 823, and 824 shown in FIG. 8 are installed in a comb structure on the substrate. The first approach sensing electrode arrays and the second approach sensing electrode arrays are alternately inserted, thereby increasing the area in which the first and second approach sensing electrode arrays are close to each other. As a result, approach of an object within the 3D approach sensing region 300 may be more accurately detected.

FIG. 9 is a sectional view of a region F shown in FIG. 8. The first connection lead 811a and the second connection lead 821h intersect in the region F, being vertically separated from each other by a predetermined interval. The second connection lead 821h interconnects the two second electrode pads 821d and 821e.

When a finger (not shown) gets in the 3D approach sensing region and approaches an upper portion of the first connection lead, the flow of the electric field E may be changed by the finger. According to the change of the electric field E, the capacitance between the first connection lead 811a and the second connection lead 821h may be varied.

Figure 10:
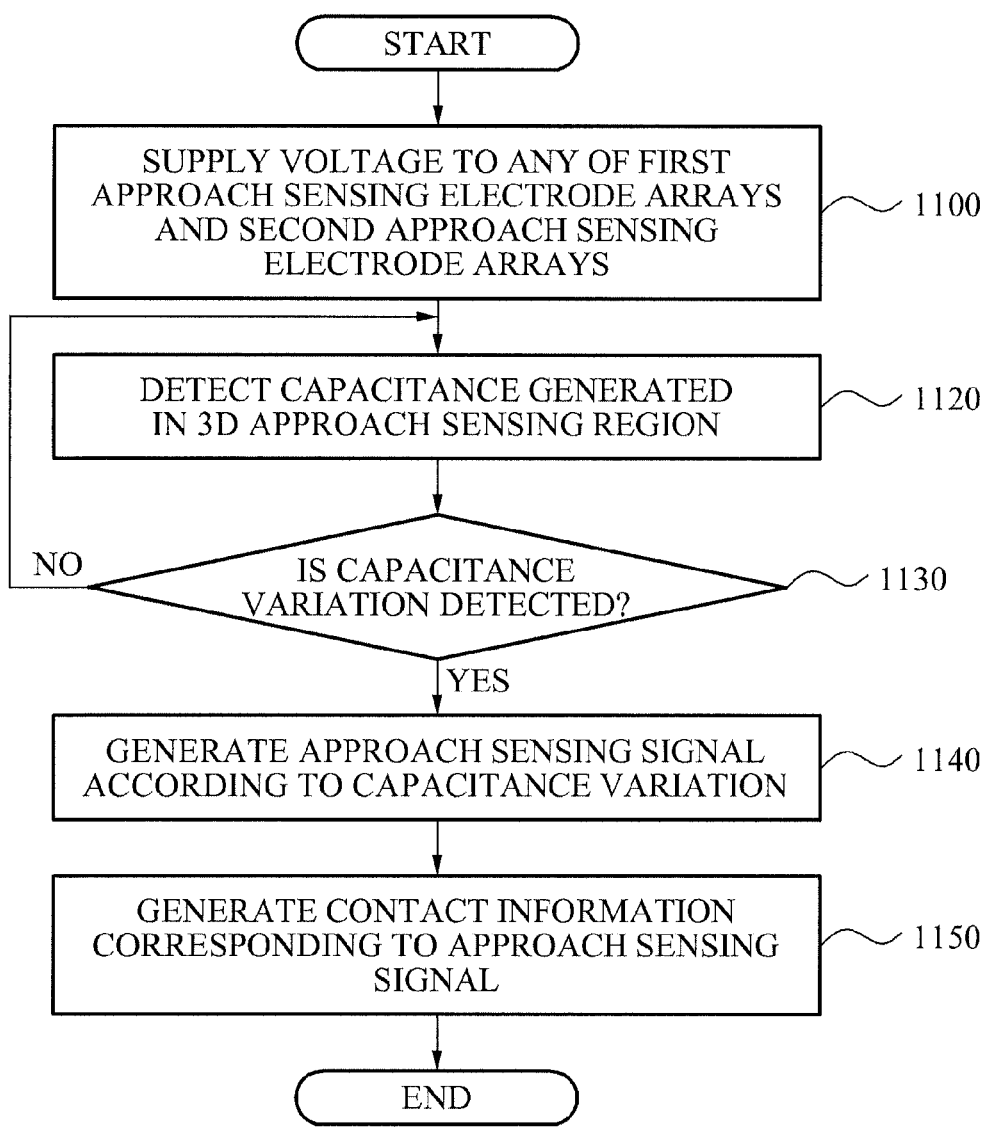
FIG. 10 illustrates a flowchart explaining a method of detecting approach of the touch sensing apparatus, according to example embodiments.

FIG. 10 illustrates a flowchart explaining a method of detecting approach of a touch sensing apparatus 100, according to example embodiments. Referring to FIG. 10, the touch sensing apparatus 100 supplies a voltage to a plurality of first approach sensing electrode arrays or a plurality of second approach sensing electrode arrays in operation 1110. The touch sensing apparatus 100 switches on the first approach sensing electrode arrays or the second approach sensing electrode arrays and supplies the voltage to the switched approach sensing electrode arrays. Accordingly, an electric field is generated between the first approach sensing electrode arrays and the second approach sensing electrode arrays which are close to each other. Therefore, a capacitance corresponding to the electric field is generated.

Next, the touch sensing apparatus 100 detects a variation of the capacitance generated between the plurality of first approach sensing electrode arrays and the plurality of second approach sensing electrode arrays, the variation occurring in a 3D approach sensing region in operation 1120. The touch sensing apparatus 100 detects the capacitance generated between the first approach sensing electrode arrays and the second approach sensing electrode arrays by sequentially scanning at least one of the first approach sensing electrode arrays and the second approach sensing electrode arrays, which are not supplied with the voltage, for example, which are not switched on.

When a variation of the capacitance is detected from a certain position in operation 1130, the touch sensing apparatus 100 generates an approach sensing signal according to the variation of capacitance in operation 1140. The touch sensing apparatus 100 calculates a difference between the detected capacitance and a reference capacitance and accordingly generates the approach sensing signal denoting detection of approach within the 3D approach sensing region. The approach sensing signal may include information on x, y, and z coordinates of the position where the capacitance variation is detected.

Next, the touch sensing apparatus 100 generates contact information corresponding to the approach sensing signal in operation 1150. The contact information may include at least one of position information and motion information regarding the object approaching within the 3D approach sensing region.

According to the approach sensing method illustrated in FIG. 10, an object approaching within the 3D approach sensing region using a plurality of first approach sensing electrode arrays and a plurality of second approach sensing electrode arrays 2-dimensionally arranged on a substrate.

According to the example embodiments, position information and motion information regarding an object approaching within a 3D approach sensing region may be generated using a plurality of first approach sensing electrode arrays and a plurality of second approach sensing electrode arrays 2-dimensionally arranged on a substrate.

In addition, the accuracy of detecting an object within a 3D approach sensing region may be increased by arranging the first approach sensing electrode arrays and the second approach sensing electrode arrays close to each other.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files including higher level code that may be executed by the computer using an interpreter. The described hardware devices may be configured to act as one or more software modules in order to perform the operations of the above-described example embodiments, or vice versa.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Although example embodiments have been shown and described, it would be appreciated by those skilled in the art that changes may be made in these example embodiments without departing from the principles and spirit of the disclosure, the scope of which is defined in the claims and their equivalents.

What is claimed is:
1. A touch sensing apparatus comprising:
an approach sensing electrode unit comprising a plurality of first approach sensing electrode arrays disposed on a substrate and a plurality of second approach sensing electrode arrays disposed adjacent to the plurality of first approach sensing electrode arrays;
a voltage supply unit to supply a voltage to at least one of the plurality of first approach sensing electrode arrays and the plurality of second approach sensing electrode arrays;
a signal generation unit to generate an approach sensing signal by detecting a variation of capacitance generated between the plurality of first approach sensing electrode arrays and the plurality of second approach sensing electrode arrays, the variation of capacitance occurring in a 3-dimensional (3D) approach sensing region; and
an information generation unit to generate contact information corresponding to the approach sensing signal generated by the signal generation unit,
wherein the plurality of second approach sensing electrode arrays intersect the plurality of first approach sensing electrode arrays, and a through hole is formed in the plurality of second approach sensing electrode arrays at intersection positions with respect to the plurality of first approach sensing electrode arrays.

2. The touch sensing apparatus of claim 1, wherein the signal generation unit generates the approach sensing signal by detecting a change of an electric field formed between the plurality of first approach sensing electrode arrays and the plurality of second approach sensing electrode arrays.

3. The touch sensing apparatus of claim 1, further comprising a switch unit connected to the voltage supply unit to switch on at least one of the plurality of first approach sensing electrode arrays and the plurality of second approach sensing electrode arrays and to supply a voltage to the switched electrode arrays.

4. The touch sensing apparatus of claim 1, wherein the contact information comprises at least one of position information and motion information regarding an object approaching within the 3D approach sensing region.

5. The touch sensing apparatus of claim 1, wherein the plurality of first approach sensing electrode arrays comprise:
a plurality of first electrode pads arranged at predetermined intervals along one axis of the substrate; and
a plurality of first connection leads arranged to connect the plurality of first electrode pads to one another.

6. The touch sensing apparatus of claim 5, wherein the plurality of second approach sensing electrode arrays comprise:
a plurality of second electrode pads arranged at predetermined intervals along the other axis of the substrate; and
a plurality of second connection leads arranged to connect the plurality of second electrode pads while intersecting the plurality of first connection leads.

7. The touch sensing apparatus of claim 6, wherein the plurality of first electrode pads and the plurality of second electrode pads have a polygonal shape and vertically cross each other.

8. The touch sensing apparatus of claim 7, wherein
the plurality of first connection leads are shorter than a minimum width of the plurality of first electrode pads, and
the plurality of second connection leads are shorter than a minimum width of the plurality of second electrode pads.

9. The touch sensing apparatus of claim 6, wherein the plurality of first approach sensing electrode arrays further comprise a plurality of first sub electrode pads connected to both ends of each of the plurality of first electrode pads in parallel by a plurality of first sub connection leads.

10. The touch sensing apparatus of claim 9, wherein the plurality of second approach sensing electrode arrays further comprise a plurality of second sub electrode pads vertically connected to both ends of each of the plurality of second electrode pads and inserted in spaces formed between the plurality of first electrode pads and the plurality of first sub electrode pads.

11. A method of sensing an approach by a touch sensing apparatus, comprising:
supplying a voltage to at least one of a plurality of first approach sensing electrode arrays disposed on a substrate and a plurality of second approach sensing arrays disposed adjacent to the plurality of first approach sensing electrode arrays;
detecting a variation of capacitance generated between the plurality of first approach sensing electrode arrays and the plurality of second approach sensing electrode arrays, the variation of capacitance occurring in a 3-dimensional (3D) approach sensing region;
generating an approach sensing signal denoting detection of approach within the 3D approach sensing region using the detected capacitance; and
generating contact information corresponding to the generated approach sensing signal,
wherein the plurality of second approach sensing electrode arrays intersect the plurality of first approach sensing electrode arrays, and a through hole is formed in the plurality of second approach sensing electrode arrays at intersection positions with respect to the plurality of first approach sensing electrode arrays.

12. The method of claim 11, wherein the detecting of the variation of capacitance comprises detecting the capacitance variation according to a change of an electric field generated between the plurality of first approach sensing electrode arrays and the plurality of second approach sensing electrode arrays.

13. The method of claim 11, wherein the supplying of the voltage comprises:
switching on at least one of the plurality of first approach sensing electrode arrays and the plurality of second approach sensing electrode arrays; and
supplying the voltage to the switched electrode arrays.

14. The method of claim 11, wherein the contact information comprises at least one of position information and motion information regarding an object approaching within the 3D approach sensing region.

15. A non-transitory computer readable recording medium storing a program to cause a computer to implement the method of claim 11.

16. A touch sensing apparatus comprising:
approach sensing electrode arrays disposed on a substrate;
a signal generation unit to generate an approach sensing signal by detecting a variation of capacitance generated between the approach sensing electrode arrays when an object approaches the approach sensing electrode arrays, the variation of capacitance occurring in a 3-dimensional (3D) approach sensing region; and
an information generation unit to generate contact information corresponding to the approach sensing signal generated by the signal generation unit,
wherein the approach sensing electrode arrays comprise:
a plurality of first electrode pads arranged at predetermined intervals along a first axis of the substrate;
a plurality of second electrode pads arranged at predetermined intervals along a second axis of the substrate; and
a plurality of first sub electrode pads connected to opposite sides of each of the plurality of first electrode pads via a plurality of first sub connection leads, the plurality of first sub electrode pads being disposed parallel to the plurality of first electrode pads.

17. The touch sensing apparatus of claim 16, wherein the signal generation unit generates the approach sensing signal by detecting a change of an electric field formed between the approach sensing electrode arrays.

18. The touch sensing apparatus of claim 16, further comprising a plurality of second sub electrode pads connected to opposite sides of each of the plurality of second electrode pads via a plurality of second sub connection leads, the plurality of second sub electrode pads being disposed perpendicular to the plurality of second electrode pads.

19. The touch sensing apparatus of claim 18, wherein the plurality of first electrode pads and the plurality of first sub electrode pads form a first comb structure, and the plurality of second electrode pads and the plurality of second sub electrode pads form a second comb structure, wherein the first comb structure is inserted between the second comb structure.

20. A method of sensing an approach by a touch sensing apparatus, comprising:
detecting a variation of capacitance generated between approach sensing electrode arrays disposed on a substrate when an object approaches the approach sensing electrode arrays, the variation of capacitance occurring in a 3-dimensional (3D) approach sensing region;
generating an approach sensing signal denoting detection of approach within the 3D approach sensing region using the detected capacitance; and
generating contact information corresponding to the generated approach sensing signal,
wherein the approach sensing electrode arrays comprise:
a plurality of first electrode pads arranged at predetermined intervals along a first axis of the substrate;
a plurality of second electrode pads arranged at predetermined intervals along a second axis of the substrate; and
a plurality of first sub electrode pads connected to opposite sides of each of the plurality of first electrode pads via a plurality of first sub connection leads, the plurality of first sub electrode pads being disposed parallel to the plurality of first electrode pads.

21. The method of claim 18, wherein the detecting of the variation of capacitance comprises detecting the capacitance variation according to a change of an electric field generated between the approach sensing electrode arrays.

* * * * *

UNITED STATES PATENT AND TRADEMARK OFFICE
CERTIFICATE OF CORRECTION

| | | |
|---|---|---|
| PATENT NO. | : 8,680,877 B2 | Page 1 of 1 |
| APPLICATION NO. | : 13/181876 | |
| DATED | : March 25, 2014 | |
| INVENTOR(S) | : Lee et al. | |

It is certified that error appears in the above-identified patent and that said Letters Patent is hereby corrected as shown below:

In the Claims

Column 14, Line 53, In Claim 21, delete "claim 18," and insert -- claim 20, --, therefor.

Signed and Sealed this
First Day of July, 2014

Michelle K. Lee
*Deputy Director of the United States Patent and Trademark Office*